(12) United States Patent
Borufka et al.

(10) Patent No.: US 8,851,847 B2
(45) Date of Patent: Oct. 7, 2014

(54) ROTOR FOR A TURBO MACHINE

(75) Inventors: Hans Peter Borufka, Starnberg (DE);
Frank Stiehler, Bad Liebenwerda (DE)

(73) Assignee: MTU Aero Engines GmbH, Munich (DE)

( * ) Notice: Subject to any disclaimer, the term of this patent is extended or adjusted under 35 U.S.C. 154(b) by 462 days.

(21) Appl. No.: 13/296,070

(22) Filed: Nov. 14, 2011

(65) Prior Publication Data

US 2012/0121437 A1    May 17, 2012

(30) Foreign Application Priority Data

Nov. 15, 2010  (EP) .................................... 10191243
Nov. 17, 2010  (EP) .................................... 10191460
Nov. 17, 2010  (EP) .................................... 10191461
Nov. 17, 2010  (EP) .................................... 10191462

(51) Int. Cl.
*F04D 29/34* (2006.01)
*F04D 29/66* (2006.01)
*F01D 5/22* (2006.01)
*F04D 29/32* (2006.01)
*F01D 11/00* (2006.01)

(52) U.S. Cl.
CPC ............ *F04D 29/321* (2013.01); *F04D 29/668* (2013.01); *Y02T 50/676* (2013.01); *F01D 5/22* (2013.01); *Y02T 50/673* (2013.01); *Y02T 50/671* (2013.01); *F01D 11/006* (2013.01)
USPC ..................................................... 416/97 R

(58) Field of Classification Search
CPC ........... F01D 5/082; F01D 5/085; F01D 5/10; F01D 5/3015; F01D 5/081; F01D 5/027; F01D 5/30

USPC ...... 416/95, 97 R, 189, 193 R, 193 A, 204 R, 416/214 R, 214 A, 219 R, 220 R, 500; 415/115

See application file for complete search history.

(56) References Cited

U.S. PATENT DOCUMENTS 3,181,835 A * 5/1965 Davis ............................ 416/145
3,266,770 A * 8/1966 Harlow .......................... 416/92

(Continued)

FOREIGN PATENT DOCUMENTS

DE           4422965 A1    1/1996
EP           0314606 A2    5/1989

(Continued)

*Primary Examiner* — Edward Look
*Assistant Examiner* — Eldon Brockman
(74) *Attorney, Agent, or Firm* — Barlow, Josephs & Holmes, Ltd.

(57) ABSTRACT

The invention relates to a rotor (10) for a turbo machine, in particular for an aircraft turbine, having rotating blades (12), which are joined with a basic rotor body (16) and, radially underneath their blade platforms (18), comprise channels (22) for introducing cooling air (KL) into rotating blades (12), whereby a gas diffusor (24) is provided on a high-pressure (HD) side of rotor (10), this diffusor being designed to at least reduce a hot-gas (HL) flow into channels (22) during the operation of the associated turbo machine and to permit an entry of cooling air (KL) into channels (22), whereby gas diffusor (24) is joined to rotor (10) and comprises a blocking element (28) running annularly in the circumferential direction of rotor (10). A related method for manufacturing, repairing and/or overhauling a rotor (10) for a turbo machine is also provided.

15 Claims, 4 Drawing Sheets

(56) References Cited

U.S. PATENT DOCUMENTS

| | | | |
|---|---|---|---|
| 3,501,249 A * | 3/1970 | Scalzo et al. | 416/95 |
| 3,572,966 A * | 3/1971 | Borden et al. | 416/95 |
| 3,807,898 A * | 4/1974 | Guy et al. | 416/220 R |
| 3,814,539 A | 6/1974 | Klompas | |
| 4,021,138 A * | 5/1977 | Scalzo et al. | 416/95 |
| 4,086,757 A * | 5/1978 | Karstensen et al. | 60/791 |
| 4,171,930 A * | 10/1979 | Brisken et al. | 416/220 R |
| 4,507,052 A * | 3/1985 | Thompson | 416/193 A |
| 4,767,276 A * | 8/1988 | Barnes et al. | 416/221 |
| 4,813,848 A * | 3/1989 | Novotny | 416/95 |
| 4,822,244 A * | 4/1989 | Maier et al. | 416/95 |
| 4,872,810 A * | 10/1989 | Brown et al. | 416/145 |
| 4,890,981 A * | 1/1990 | Corsmeier et al. | 416/220 R |
| 5,173,024 A * | 12/1992 | Mouchel et al. | 416/220 R |
| 5,275,534 A * | 1/1994 | Cameron et al. | 416/95 |
| 5,310,319 A * | 5/1994 | Grant et al. | 416/220 R |
| 5,503,528 A * | 4/1996 | Glezer et al. | 416/96 R |
| 5,800,124 A * | 9/1998 | Zelesky | 416/95 |
| 5,816,776 A * | 10/1998 | Chambon et al. | 415/174.5 |
| 5,984,636 A * | 11/1999 | Fahndrich et al. | 416/96 R |
| 6,077,035 A * | 6/2000 | Walters et al. | 415/115 |
| 6,190,131 B1 * | 2/2001 | Deallenbach | 416/144 |
| 6,464,453 B2 * | 10/2002 | Toborg et al. | 415/115 |
| 6,481,959 B1 * | 11/2002 | Morris et al. | 415/115 |
| 6,893,222 B2 * | 5/2005 | Allam | 416/144 |
| 6,971,852 B2 * | 12/2005 | Phipps et al. | 416/1 |
| 7,264,447 B2 * | 9/2007 | Ono et al. | 416/193 A |
| 7,347,672 B2 * | 3/2008 | Bertrand et al. | 416/145 |
| 7,556,474 B2 * | 7/2009 | Marchi | 415/115 |
| 7,874,799 B2 * | 1/2011 | Young et al. | 416/97 R |
| 8,025,483 B2 * | 9/2011 | Blanchard et al. | 416/144 |
| 8,087,879 B2 * | 1/2012 | Dejaune et al. | 415/115 |
| 8,092,152 B2 * | 1/2012 | Dejaune et al. | 415/115 |
| 8,152,436 B2 * | 4/2012 | Glasspoole et al. | 415/1 |
| 8,206,119 B2 * | 6/2012 | Liotta et al. | 416/220 R |
| 8,602,734 B2 * | 12/2013 | Philippot | 416/97 R |
| 2004/0247429 A1 * | 12/2004 | Arilla et al. | 415/116 |
| 2005/0163608 A1 * | 7/2005 | Okita et al. | 415/115 |
| 2008/0181767 A1 * | 7/2008 | Brillert et al. | 415/170.1 |
| 2009/0004006 A1 * | 1/2009 | Dejaune et al. | 416/95 |
| 2009/0004023 A1 * | 1/2009 | Dejaune et al. | 416/97 R |
| 2009/0304509 A1 * | 12/2009 | Blanchard et al. | 416/144 |
| 2010/0196164 A1 * | 8/2010 | Liotta et al. | 416/220 R |

FOREIGN PATENT DOCUMENTS

| | | |
|---|---|---|
| EP | 0690202 A2 | 1/1996 |
| EP | 1464792 A1 | 10/2004 |
| EP | 1503046 A2 | 2/2005 |

* cited by examiner

ROTOR FOR A TURBO MACHINE

BACKGROUND OF THE INVENTION

The invention relates to a rotor of the type indicated in the preamble of patent claim 1, a turbo machine with a rotor, as well as a method for manufacturing, repairing and/or overhauling a rotor for a turbo machine.

This type of rotor for a turbo machine comprises rotating blades, which are joined with a basic rotor body and comprise channels for introducing cooling air into the rotating blades radially underneath their blade platforms. Compressed air taken at a suitable place from a compressor of the turbo machine is usually used for the cooling of rotating blades. During the operation of a turbo machine provided with this type of rotor, however, a reliable demarcation and guiding of the flows of cooling air and hot gas must be assured. In order to prevent a feed of hot gas into channels and spaces that conduct cooling air, usually a gas diffusor is disposed on the high-pressure side of the rotor, and during operation of the turbo machine, on the one hand, this diffusor completely prevents or at least largely reduces a flow of hot gas into the channels, and, on the other hand, permits an entry of cooling air into the channels.

DE 44 22 965 A1, for example, discloses a turbo machine, in which a deflecting plate or baffle is attached to a stator disposed upstream of the rotor, for shielding against the flow of hot gas as well as for conducting the cooling-air flow through a rotating blade.

SUMMARY OF THE INVENTION

The object of the present invention is to provide a rotor for a turbo machine that has an improved conducting system for hot gas and cooling air. Further objects of the invention consist of providing a turbo machine having a rotor of this type as well as a method for manufacturing, repairing, and/or overhauling such a rotor for a turbo machine.

The objects are accomplished according to the invention by a rotor with the features of patent claim 1, by a turbo machine according to patent claim 13, as well as by a method according to patent claim 14. Advantageous embodiments of the invention are given in the respective subclaims, in which advantageous embodiments of the rotor are to be viewed as advantageous embodiments of the turbo machine and/or of the method, and vice versa.

A rotor, which has an improved system for conducting hot gas and cooling air, is created according to the invention, in that the gas diffusor is joined to the rotor and comprises a blocking element running annularly in the circumferential direction of the rotor, and, in order to reduce the flow of hot gas, this diffusor is disposed between the undersides of radially inner blade shrouds of the rotating blades and a region connecting the rotating blades to the basic rotor body. In other words, unlike the prior art, the gas diffusor or the blocking element is joined to the rotor on its front side relative to the engine and rotates with it during the operation of the turbo machine. The blade shrouds serve for partially bounding a flow or gas channel of the turbo machine, whereby the rotating blades can basically also have a radially outer blade shroud. The blocking element, which can be formed, for example, plate-shaped, prevents or reduces, at least for the most part, the otherwise unhindered through-flow of the hot gas out of the gas channel of the turbo machine into the channels of the rotor. Therefore, on the one hand, it forms a hot-gas barrier, but, on the other hand, it additionally permits the entry of cooling air into the channels.

Based on its annular configuration and its relatively small radial extent between the undersides of the blade shrouds and the region connecting the rotating blades to the basic rotor body, the blocking element also has a relatively small moving mass. Due to its structurally simple construction, the blocking element also has a very good mechanical integrity of its structure. Further, a stable and secure operation of the rotor is assured by the configuration of the gas diffusor according to the invention, since components that move relative to the rotor are not present. Based on the simple construction, the rotor is also correspondingly simple and cost-effective in its manufacture and can also be repaired or overhauled in a particularly simple and cost-favorable manner.

In an advantageous embodiment of the invention, it is provided that the blocking element is joined to the undersides of the radially inner blade shrouds of the rotating blades and/or comprises several blocking element segments formed in one piece with the rotating blades and/or is fixed in the region connecting the rotating blades to the basic rotor body. In this way, a high structural freedom is achieved, so that the rotor can be flexibly adapted to different requirement profiles, application objectives and flow conditions.

Further advantages result by joining the blocking element cohesively and/or in a form-fitting manner and/or in a force-fitting manner with the undersides of the radially inner blade shrouds. This permits a flexible, mechanically stable and hot-gas-tolerant connection of the blocking element to the rotor.

In another advantageous embodiment of the invention, it is provided that the blocking element covers between 20% and 90%, in particular between 30% and 60%, of the inlet surfaces of the channels. In other words, it is provided that the blocking element covers 20%, 25%, 30%, 35%, 40%, 45%, 50%, 55%, 60%, 65%, 70%, 75%, 80%, 85% or 90% of the individual inlet surfaces of the channels and shields them from entry of hot gas. It has been shown to be particularly advantageous when the blocking element covers 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59% or 60% of the inlet surfaces, since on the one hand, an optimal shielding from hot gas and, on the other hand, an optimal introduction of cooling air are assured thereby for most applications.

Further advantages result when the blocking element comprises at least one through-opening, by means of which cooling air can enter into the channels. This is then particularly of advantage when the blocking element extends over the entire radial height of the channels. In addition, this type of through-opening offers another simple possibility for the optimal adjustment of flow with respect to shielding from hot gas and throughput of cooling air.

A particularly advantageous conducting of the flows of hot gas and cooling air is achieved in another embodiment in that in each case, a through-opening is provided for at least two adjacent channels.

A connection to the rotor that is particularly secure in operation is made possible in another embodiment of the invention, in that the gas diffusor comprises at least one securing element, in particular a securing wire, by means of which a relative axial and/or radial movement of the blocking element in relation to the basic rotor body is prevented.

In another advantageous embodiment of the invention, it is provided that the gas diffusor comprises at least one balancing device, by means of which the rotor can be balanced statically and/or dynamically. This represents a structurally simple possibility for eliminating any unbalancing of the rotor that could otherwise lead to vibrations, noise and high wear. The balancing device is advantageously designed in such a way that the mass balance can be positive or negative. With a positive balance, one or more balancing weights can be attached, for example, by welding, bonding or screwing the weight to the balancing device of the gas diffusor. With negative balance, mass can be removed from the balancing device, e.g., by drilling, grinding or milling.

Because the balancing device comprises several recesses for inserting balancing weights, these recesses being distanced from one another in the circumferential direction and/or disposed radially underneath the joining region of the rotating blades, a particularly efficient and space-saving possibility is given for attaching balancing weights.

In another advantageous embodiment of the invention, it is provided that the gas diffusor and/or at least the blocking element consist(s) of a material that is resistant to high temperatures, in particular a nickel-based alloy and/or a titanium aluminide. In this way, the rotor can be used without problem in turbine stages of aircraft engines. In particular, the use of lightweight materials that are resistant to high temperatures, such as, for example, titanium aluminide, is particularly preferred.

Further advantages result if the blocking element comprises at least one contact surface for the axial and/or radial contact to the basic rotor body and/or to the rotating blades. In this way, the tightness of the gas diffusor in relation to hot gas can be additionally increased.

In another advantageous embodiment of the invention, it is provided that the rotating blades are joined to the basic rotor body in a detachable manner and/or cohesively. Here, the rotor can be manufactured in a particularly flexible way in mounted construction and/or in integral BLISK (Bladed Disk) or BLING (Bladed Ring) construction.

Another aspect of the invention relates to a turbo machine having a rotor according to one of the preceding embodiment examples. The features resulting therefrom and their advantages can be taken from the preceding descriptions.

Another aspect of the invention relates to a method for manufacturing, repairing and/or overhauling a rotor for a turbo machine, in particular for an aircraft turbine. It is provided according to the invention that a gas diffusor is joined to the high-pressure side of the rotor and is joined in a torsionally rigid manner to the rotor, whereby the gas diffusor comprises a blocking element running annularly in the circumferential direction of the rotor, the blocking element being disposed between the undersides of radially inner blade shrouds of the rotating blades and a region connecting the rotating blades to a basic rotor body of the rotor, and at least reducing a hot-gas flow into channels that are formed radially underneath blade platforms of the rotating blades, as well as permitting an entry of cooling air into the channels, during operation of the turbo machine. The advantages resulting therefrom can be taken from the preceding descriptions.

In another advantageous embodiment of the invention, it is provided that the gas diffusor is shrunk-fit onto the basic rotor body and/or is joined cohesively to the undersides of the radially inner blade shrouds of the rotating blades and/or is riveted to the rotor. In this way, the gas diffusor can be variably joined to the rotor in a manner that safeguards operation.

BRIEF DESCRIPTION OF THE DRAWINGS

Further features of the invention result from the claims, the examples of embodiment, as well as on the basis of the drawings. The features and combinations of features named above in the description, as well as features and combinations of features named in the following for the examples of embodiment are applicable not only in the combination indicated in each case, but are also applicable in other combinations or by themselves, without departing from the scope of the invention. Herein:

DETAILED DESCRIPTION OF THE INVENTION

Figure 1:
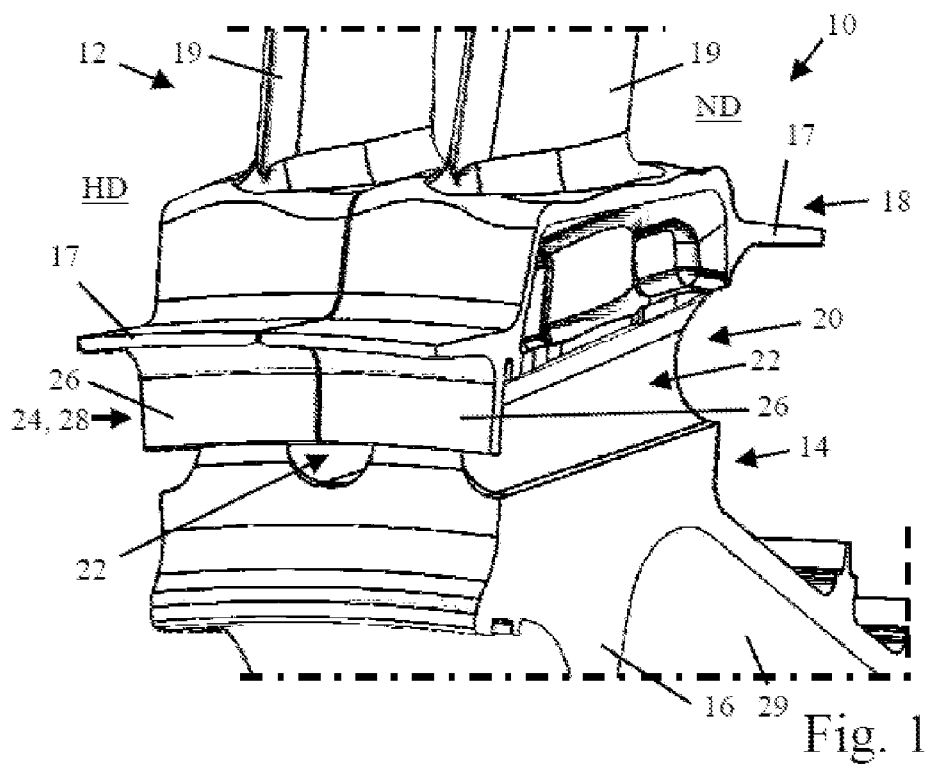
FIG. 1 shows a schematic and perspective sectional view of the high-pressure side of a rotor according to the invention, which comprises a gas diffusor according to a first example of embodiment.
Figure 2:
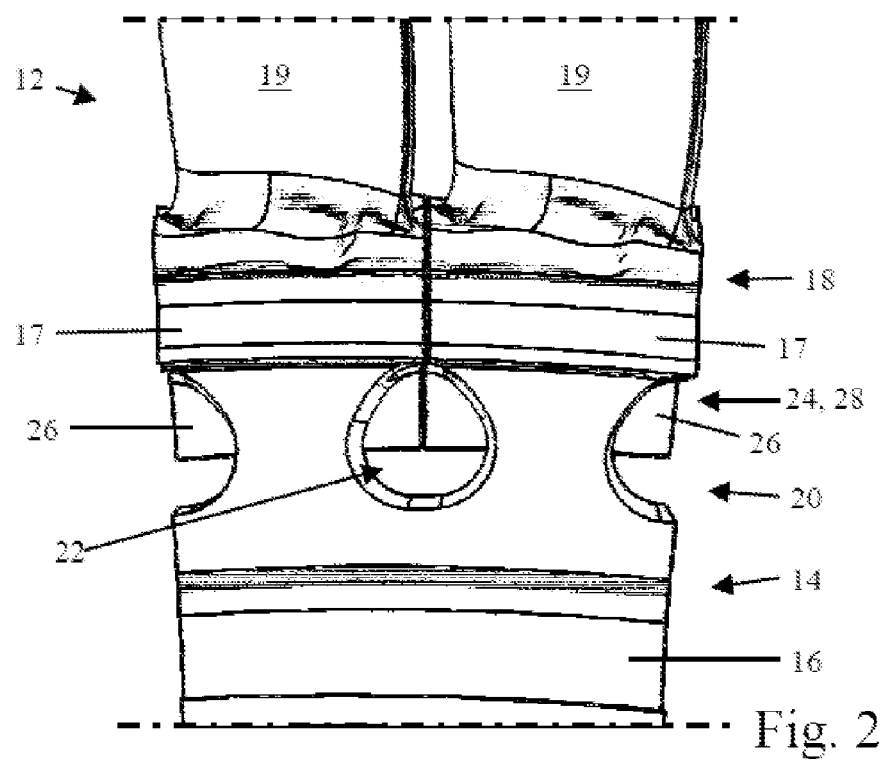
FIG. 2 shows a schematic and excerpted view of the low-pressure side of the rotor shown in FIG. 1.

FIG. 1 shows a schematic and perspective sectional view of the high-pressure (HD) side of a rotor 10 according to the invention for an aircraft turbine (not illustrated) and will be explained together with FIG. 2 in the following, whereby a schematic and excerpted view of the low-pressure (ND) side of rotor 10 shown in FIG. 1 is represented in FIG. 2. Rotor 10, which is formed presently as a so-called BLISK, comprises several rotating blades 12, of which two are presently illustrated. Each rotating blade 12 is cohesively joined in a way known in and of itself via its blade foot 14 to a disk-shaped basic rotor body 16, for example by friction welding. Between a blade platform 18, which comprises a radially inner blade shroud 17, and blade foot 14, each rotating blade 12 comprises, in the region of its blade neck 20, at least one channel 22 extending between the high-pressure (HD) side and the low-pressure (ND) side of rotor 10, and cooling air KL (see FIG. 3) can be conducted through this channel into internal cooling channels (not shown) of rotating blades 12. In the present example, each of channels 22 is formed by lateral recesses that correspond to one another in blade necks 20 of adjacent rotating blades 12. It can be basically provided that each rotating blade 12 comprises at least one complete channel 22. Radially above blade platforms 18, each rotating blade 12 comprises a blade element 19 as well as, optionally, a radially outer blade shroud 21 (see FIG. 5). In addition, basic rotor body 16 is joined to a drum 29 on its low-pressure (ND) side.

Figure 3:
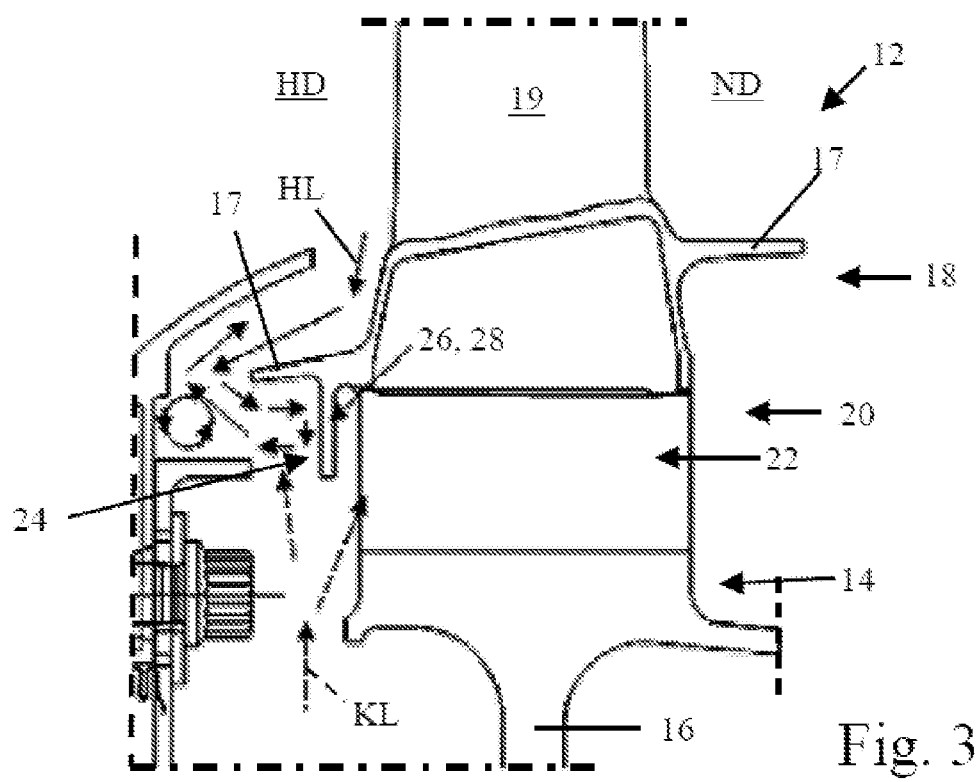
FIG. 3 shows a schematic lateral sectional view of the rotor shown in FIG. 1 and FIG. 2.

On its high-pressure side, rotor 10 is joined to a gas diffusor 24 according to a first example of embodiment, this diffusor reducing, at least to a great extent, a flow of hot gas HL into channels 22, but permitting an entry of cooling air KL into channels 22 during operation of the associated turbo machine (see FIG. 3). For this purpose, gas diffusor 24 comprises blocking element segments 26, each of which are formed in one piece with rotating blades 12 and extend from an underside of radially inner blade shrouds 17 radially toward the inside in the direction of blade feet 14 or of the region connecting rotating blades 12 to basic rotor body 16. Blocking element segments 26 in the mounted state thus form a blocking element 28 running annularly in the circumferential direction of rotor 10. In this way, depending on the desired flow conduction, it can be basically provided that blocking element segments 26 are adjacent to one another or are joined to one another in a gas-tight manner, for example, by welding. It can be recognized in FIG. 2 that blocking element 28 covers and/or shields from hot gas HL approximately 50% of the inlet surfaces of channels 22. Blocking element segments 26 comprise a temperature-resistant material, for example, titanium aluminide, and can be designed and dimensioned in a geometrically specific manner for each rotor 10.

FIG. 3 shows a schematic lateral sectional view of rotor 10 shown in FIG. 1 and FIG. 2 and illustrates the influencing of the flow that is brought about by gas diffusor 24 during operation of the associated turbo machine. The hot gas, which originates from the gas channel radially above blade platforms 18 and is symbolized by the arrows designated as HL, is deflected upon striking blocking element 28 or is deflected on the individual blocking element segments 26 and is prevented from entering into channels 22 and the following temperature-sensitive parts of rotor 10. In contrast to this, the cooling air, which originates from radially underneath channel 22 and is symbolized by the arrows designated as KL, can enter into channel 22, for the most part unhindered. A part of the cooling air KL is also used for the purpose of pressing hot gas HL radially again in the direction of the gas channel of the turbo machine.

Figure 4:
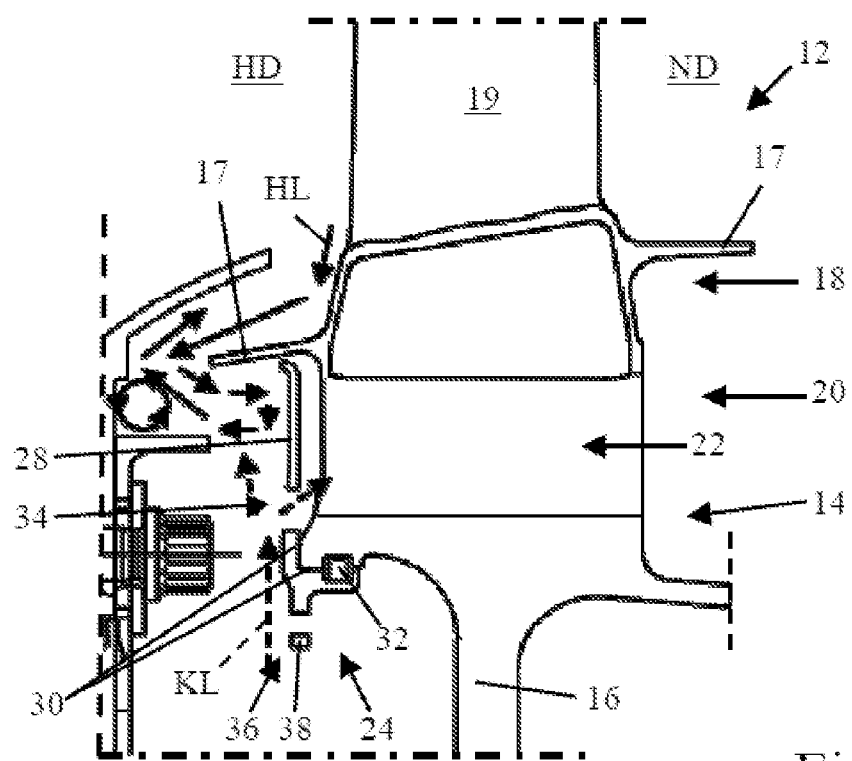
FIG. 4 shows a schematic lateral sectional view of the rotor according to the invention, which comprises an alternative gas diffusor.
Figure 5:
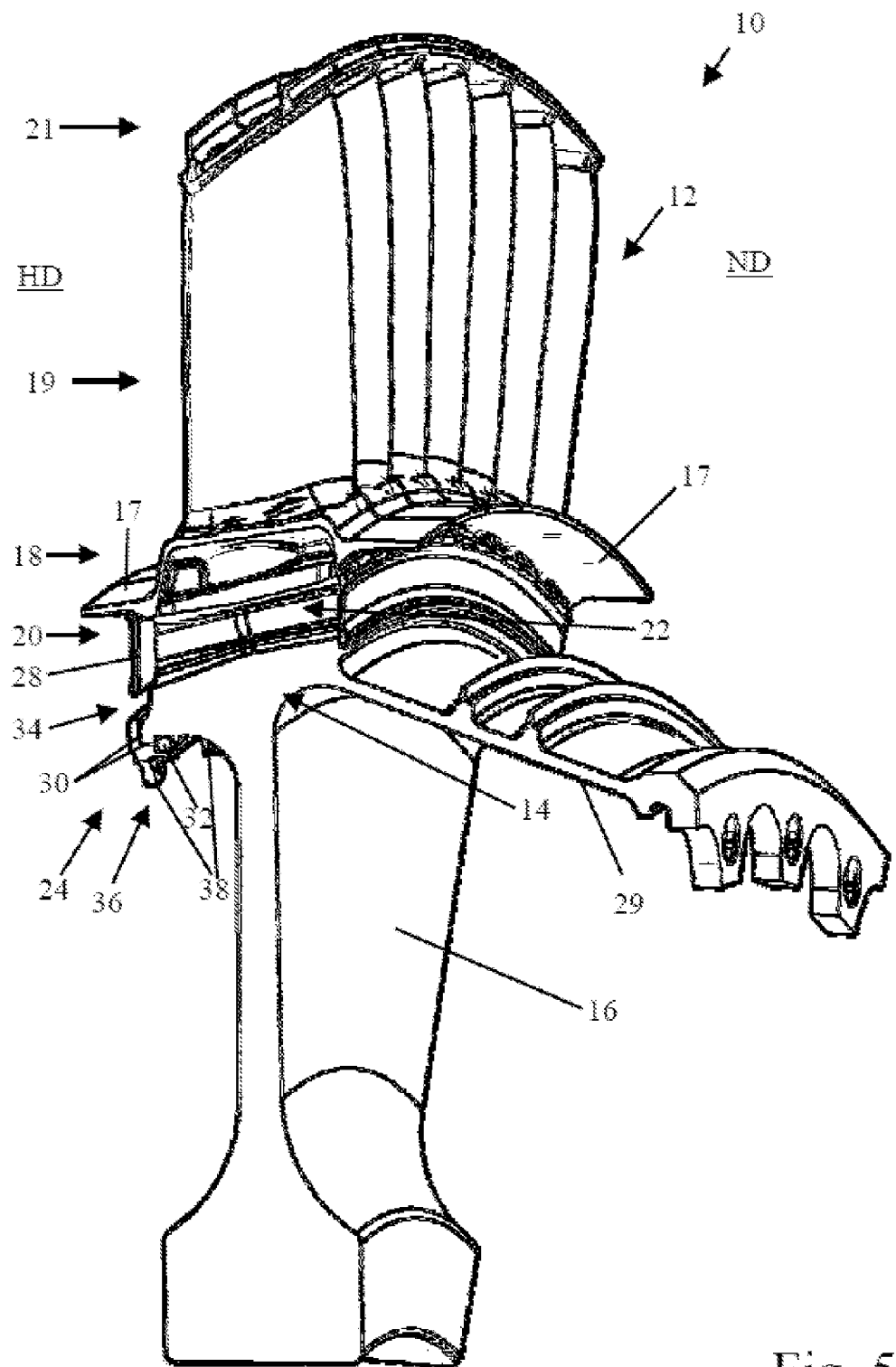
FIG. 5 shows a perspective sectional view of the low-pressure side of the rotor shown in FIG. 4.
Figure 6:
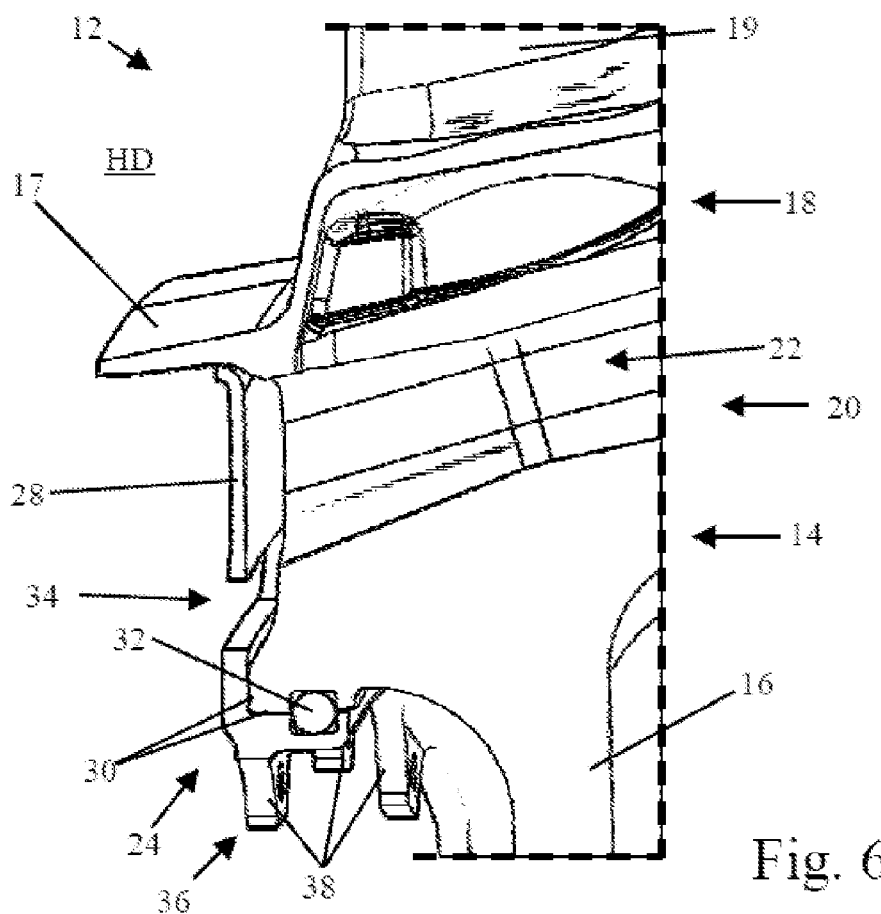
FIG. 6 shows another schematic lateral sectional view of the rotor shown in FIG. 4 and FIG. 5.
Figure 7:
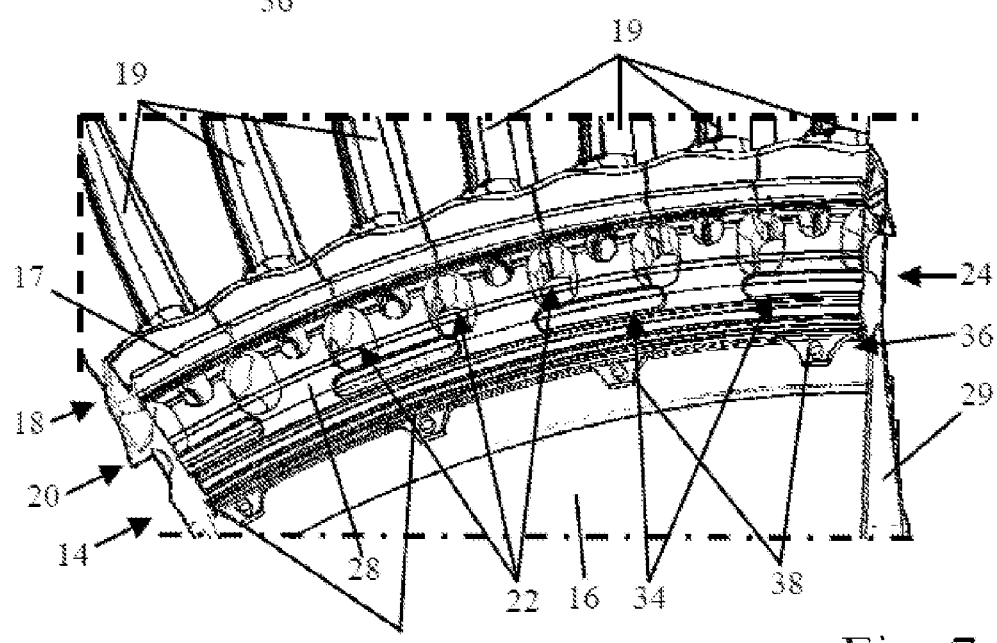
FIG. 7 shows a schematic perspective view of the high-pressure side of the rotor, in which a blocking element of the alternative gas diffusor is shown transparently.

FIG. 4 to FIG. 7 show different views of rotor 10 according to the invention with an alternative gas diffusor 24 and will be described together in the following. Here, a schematic lateral sectional view of rotor 10 according to the invention is illustrated in FIG. 4, while FIG. 5 shows a perspective sectional view of the low-pressure (ND) side of rotor 10, FIG. 6 shows another schematic lateral sectional view of rotor 10 and FIG. 7 shows a schematic perspective view of the high-pressure (HD) side of rotor 10. Blocking element 28 of gas diffusor 24 is shown transparently in FIG. 7 for reasons of clarity. The general construction of rotor 10 basically corresponds to that of rotor 10 shown in FIG. 1 to FIG. 3.

In distinction from rotor 10 according to the first example of embodiment, gas diffusor 24 comprises a continuous, annular blocking element 28, which extends completely between the undersides of the radially inner blade shrouds 17 and the region connecting rotating blades 14 to basic rotor body 16. Blocking element 28 possesses both axial as well as radial contact surfaces 30 and is fixed in a torsionally rigid manner to basic rotor body 16 in the region connecting rotating blades 14. For this purpose, gas diffusor 24 is shrunk-fit onto rotor 10 and comprises a securing element 32 formed as a securing wire. In distinction to the previous example of embodiment, blocking element 28 is not joined cohesively to blade shrouds 17, but is only applied to the latter. Basically, however, blocking element 28 can also be joined—for example, welded or riveted—to blade shrouds 17.

In order to make possible an entry of cooling air KL into channels 22, blocking element 28 comprises several lengthwise through-openings 34 (see FIG. 7) in the circumferential direction, and these opening are disposed radially underneath the inlet openings of channels 22. Each through-opening 34 provides at least two adjacent channels 22 with cooling air KL.

Further, the alternative gas diffusor 24 comprises a balancing device 36, by means of which rotor 10 can be balanced statically and dynamically. For this purpose, balancing device 36 has several recesses 38 for inserting balancing weights (not shown), these recesses being distanced from one another in the circumferential direction and disposed radially underneath the joining region of rotating blades 12.

What is claimed is:

1. A rotor (10) for a turbo machine, in particular for an aircraft turbine, having rotating blades (12) that are joined to a basic rotor body (16) and, radially underneath blade platforms (18), comprise channels (22) for introducing cooling air (KL) into the rotating blades (12), a gas diffusor (24) being provided on the high-pressure (HD) side of rotor (10), the diffusor being designed to at least reduce a hot-gas (HL) flow into channels (22) during the operation of the associated turbo machine and to permit the entry of cooling air (KL) into channels (22), is characterized in that gas diffusor (24) is joined to rotor (10) and comprises a blocking element (28) running annularly in the circumferential direction of rotor (10), this element being disposed between undersides of radially inner blade shrouds (17) of rotating blades (12) and a region connecting rotating blades (12) to basic rotor body (16), for reducing the hot gas (HL) flow;
wherein the blocking element (28) covers between 20% and 90% of the inlet surfaces of channels (22).

2. The rotor (10) according to claim 1, wherein the blocking element (28) is joined to the undersides of the radially inner blade shrouds (17) of rotating blades (12) and/or comprises several blocking element segments (26) formed in one piece with rotating blades (12) and/or is fixed in the region joining rotating blades (12) to basic rotor body (16).

3. The rotor (10) according to claim 2, wherein the blocking element (28) is joined cohesively and/or in a form-fitting manner and/or in a force-fitting manner with the undersides of the radially inner blade shrouds (17).

4. The rotor (10) according to claim 1, wherein the blocking element (28) covers between 30% and 60% of the inlet surfaces of channels (22).

5. The rotor (10) of claim 1, wherein the blocking element (28) comprises at least one through-opening (34), by means of which cooling air can enter into channels (22).

6. The rotor (10) according to claim 5, wherein, in each case, a through-opening (34) is provided for at least two adjacent channels (22).

7. The rotor (10) according to claim 1, wherein the gas diffusor (24) comprises at least one securing element (32) for preventing a relative axial and/or radial movement of blocking element (28) in relation to basic rotor body (14).

8. The rotor (10) according to claim 1, wherein the gas diffusor (24) is balanced by at least one of a positive mass balance and a negative mass balance,
wherein the positive mass balance comprises balancing weights attached to the gas diffusor; and
wherein the negative mass balance comprises areas in which mass has been removed from the gas diffusor.

9. The rotor (10) according to claim 8, wherein the balancing device (36) comprises a plurality of recesses (38) for inserting balancing weights, these recesses being distanced from one another in the circumferential direction and/or disposed radially underneath the joining region of rotating blades (12).

10. The rotor (10) according to claim 1, wherein the gas diffusor (24) and/or at least the blocking element (28) consist(s) of a material that is resistant to high temperatures, in particular a nickel-based alloy and/or a titanium aluminide.

11. The rotor (10) according to claim 1, wherein the blocking element (28) comprises at least one contact surface (30) for the axial and/or radial contact to basic rotor body (16) and/or to rotating blades (12).

12. The rotor (10) according to claim 1, wherein the rotating blades (12) are one of: joined to the basic rotor body (16) in a detachable manner and joined to the basic rotor body (16) cohesively.

13. The rotor (10) according to claim 1, wherein the rotor (10) is configured for use in a turbo machine.

14. A method for manufacturing, repairing and/or overhauling a rotor (10) for a turbo machine, in particular for an aircraft turbine, in which a gas diffusor (24) is joined in a torsionally rigid manner to rotor (10) on the high-pressure (HD) side of rotor (10), wherein gas diffusor (24) comprises a blocking element (28) running annularly in the circumferential direction of rotor (10), the blocking element being disposed between undersides of radially inner blade shrouds (17) of rotating blades (12) and a region connecting rotating blades (12) to a basic rotor body (16) of rotor (10), and the blocking element permitting a hot-gas (HL) flow to be at least reduced in channels (22), which are formed radially underneath blade platforms (18) of rotating blades (12) for introducing cooling air (KL), as well as permitting the entry of cooling air (KL) into channels (22), during the operation of the turbo machine;

wherein the blocking element (28) covers between 20% and 90% of the inlet surfaces of channels (22).

15. The method according to claim 14, wherein the gas diffusor (24) is shrunk-fit onto basic rotor body (16) and/or joined cohesively with the undersides of the radially inner blade shrouds (17) of rotating blades (12) and/or is riveted to rotor (10).

* * * * *